United States Patent
Peter

[15] 3,699,895
[45] Oct. 24, 1972

[54] TRUCK TOW CONVEYOR SWITCHING APPARATUS

[72] Inventor: Alfred O. Peter, Hatboro, Pa.

[73] Assignee: FMC Corporation, San Jose, Calif.

[22] Filed: May 5, 1971

[21] Appl. No.: 140,396

[52] U.S. Cl. .............................. 104/88, 104/172 BT
[51] Int. Cl. ................................................ B61j 3/04
[58] Field of Search .......................... 104/88, 172 BT

[56] References Cited

UNITED STATES PATENTS

| | | | |
|---|---|---|---|
| 3,261,300 | 7/1966 | Johnson | 104/88 |
| 3,316,856 | 5/1967 | Edgar et al. | 104/88 |
| 3,388,674 | 6/1968 | Dorrance | 104/88 |
| 3,406,638 | 10/1968 | Braun | 104/88 |
| 3,481,281 | 12/1969 | Johnson et al. | 104/172 BT |
| 3,503,335 | 3/1970 | Bishop | 104/88 |
| 3,538,853 | 11/1970 | Dehne | 104/172 BT |
| 3,541,963 | 11/1970 | Karlstrom | 104/172 BT |
| 3,590,742 | 7/1971 | Swartz | 104/88 |
| 3,598,059 | 8/1971 | Carney | 104/88 |

*Primary Examiner*—Drayton E. Hoffman
*Attorney*—F. W. Anderson and C. E. Tripp

[57] ABSTRACT

A mechanical switching apparatus for use in an automatic truck tow conveyor system has a switch plate for diverting coded trucks from a main slot in a reference surface to a spur slot intersecting the main slot. Two latched reader heads, located upstream from the switch plate, tension individual flexible cables when contacted by properly located code probes on the truck. Each cable is operatively connected to a motion translator device which, when both reader heads are activated simultaneously, causes the motion translator to move linearly and tension a third flexible cable. The tensioning of this third cable, which is connected to the switch plate, causes the switch plate to rotate from its closed to its open position so the truck is diverted into the spur slot. The motion translator prevents accidental movement of the switch except when two properly coded probes release the two latched reader heads simultaneously.

23 Claims, 20 Drawing Figures

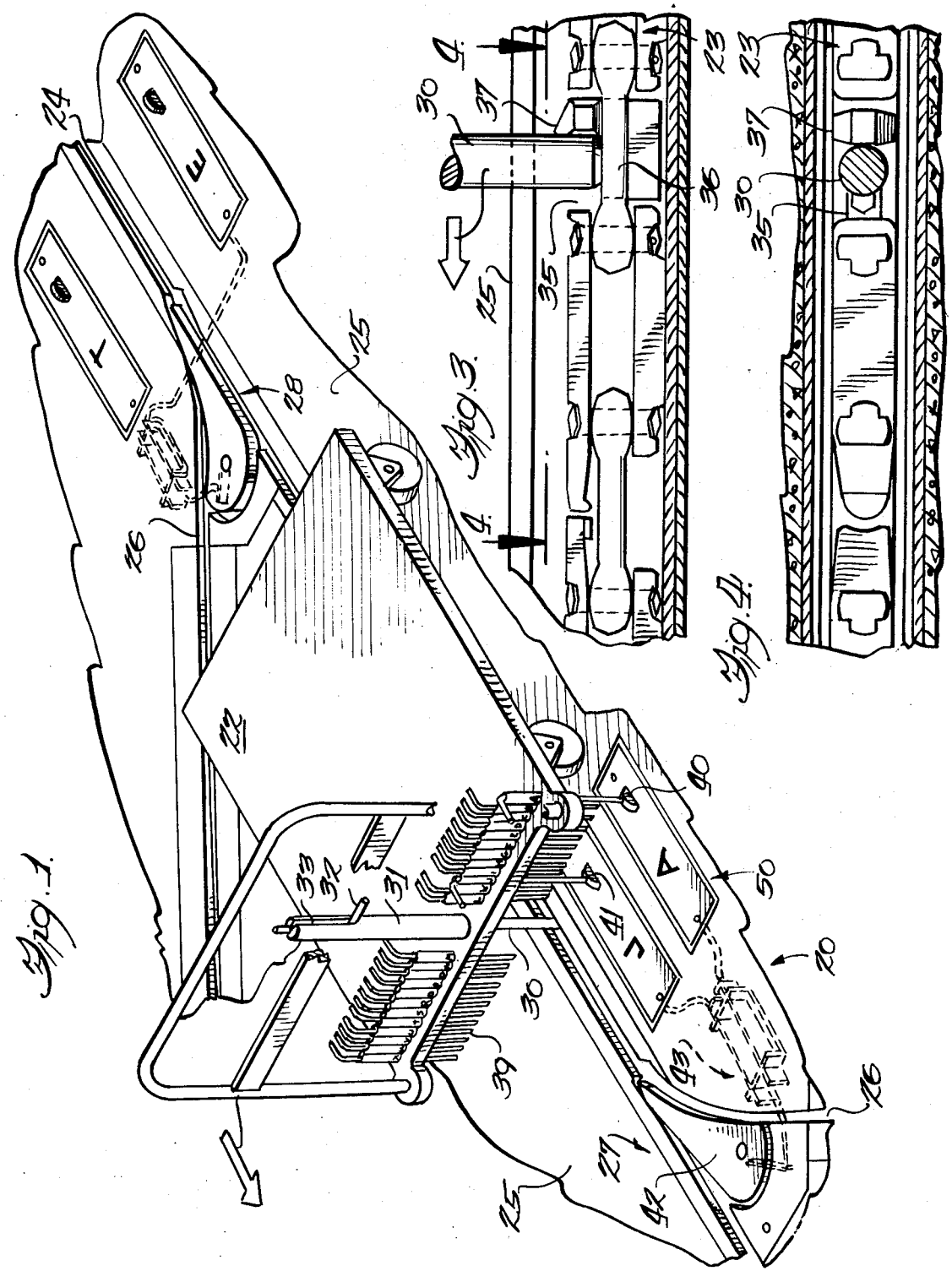

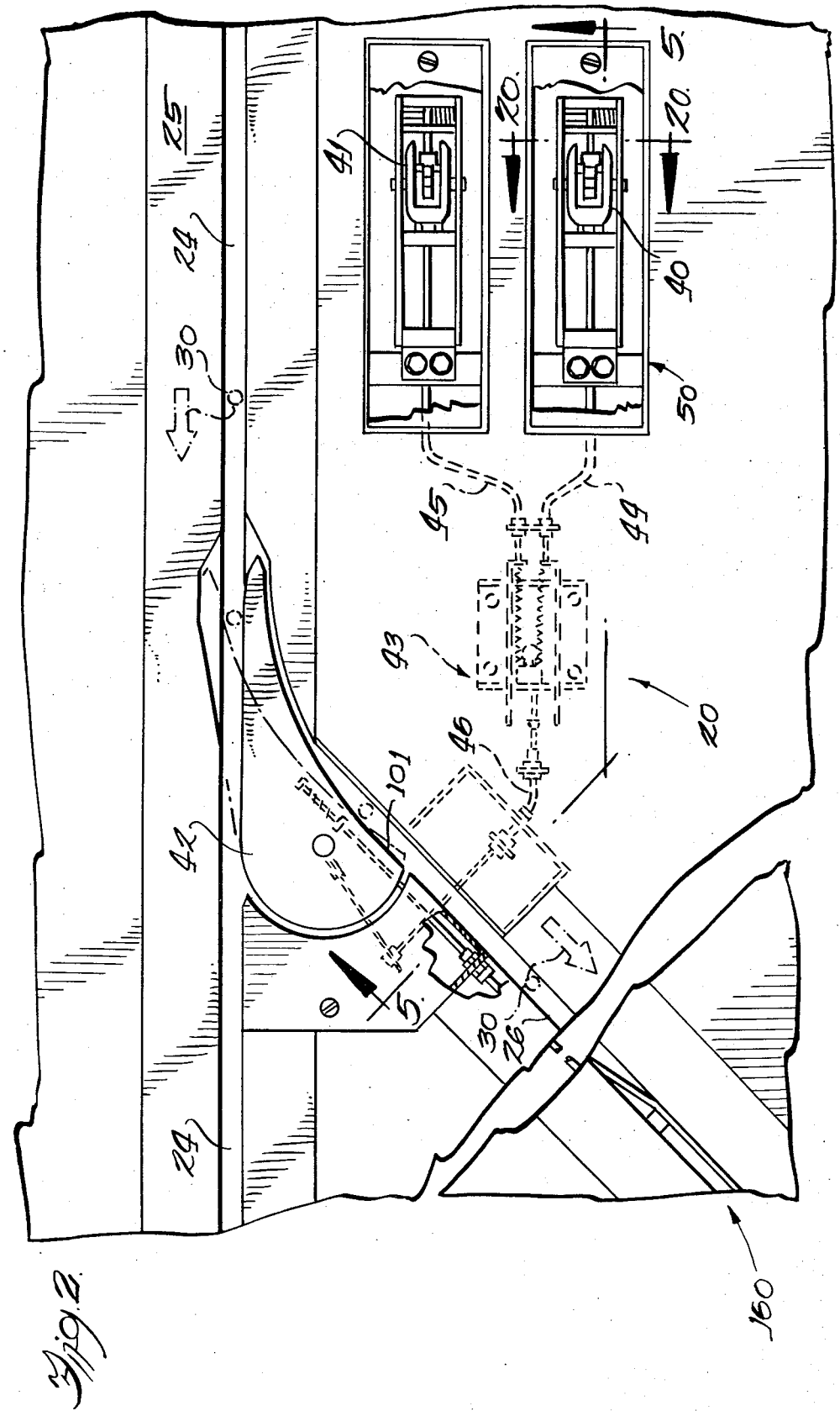

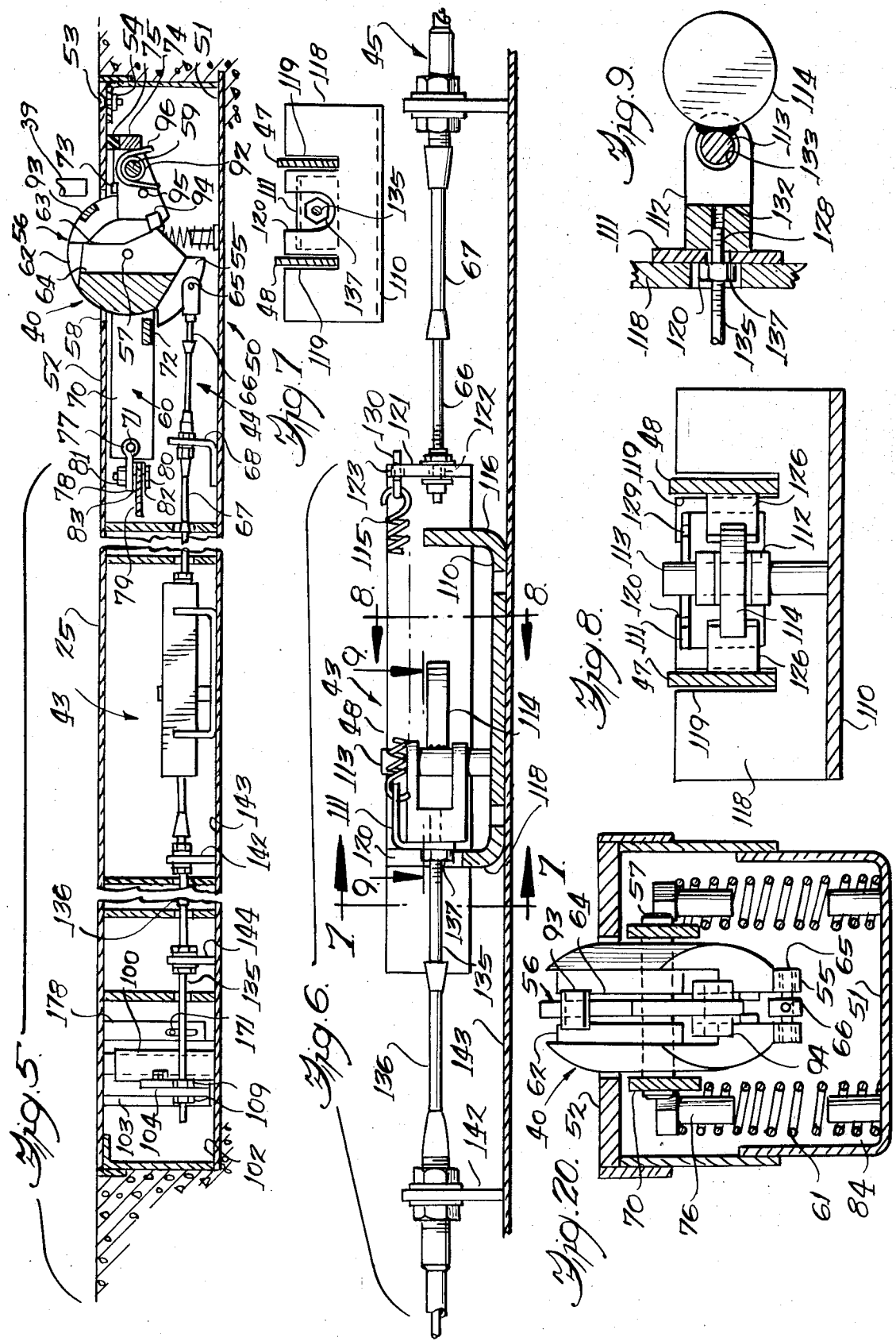

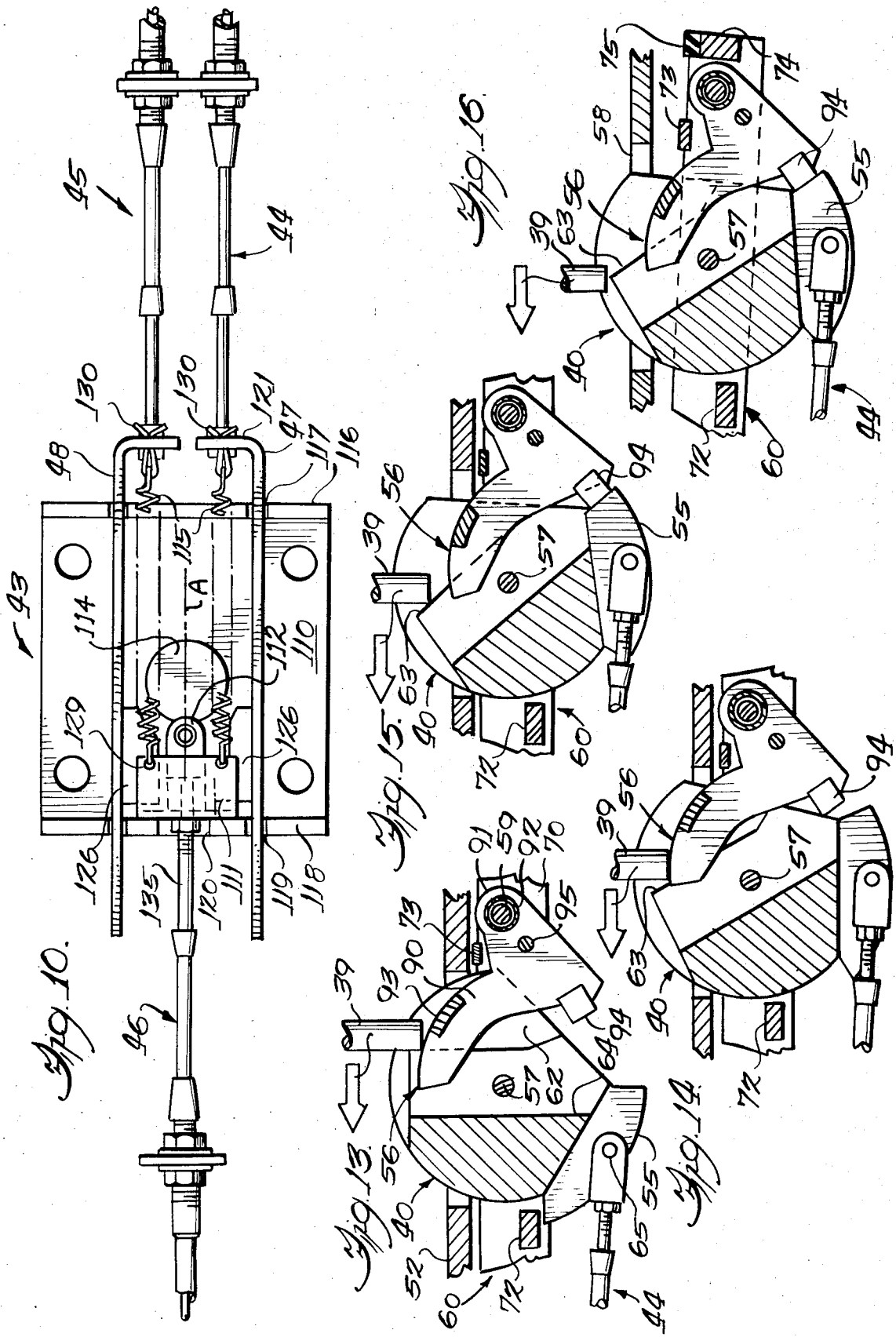

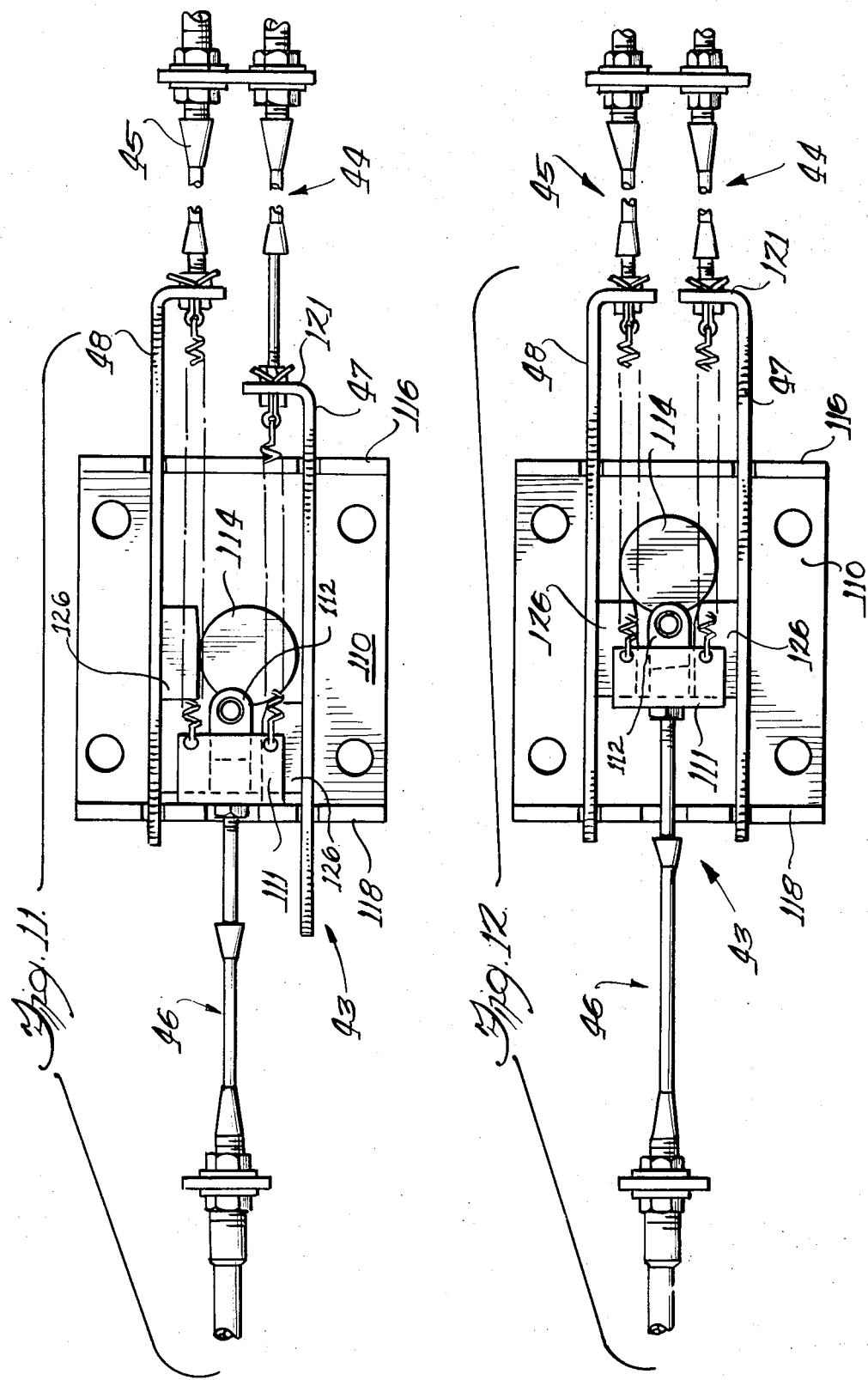

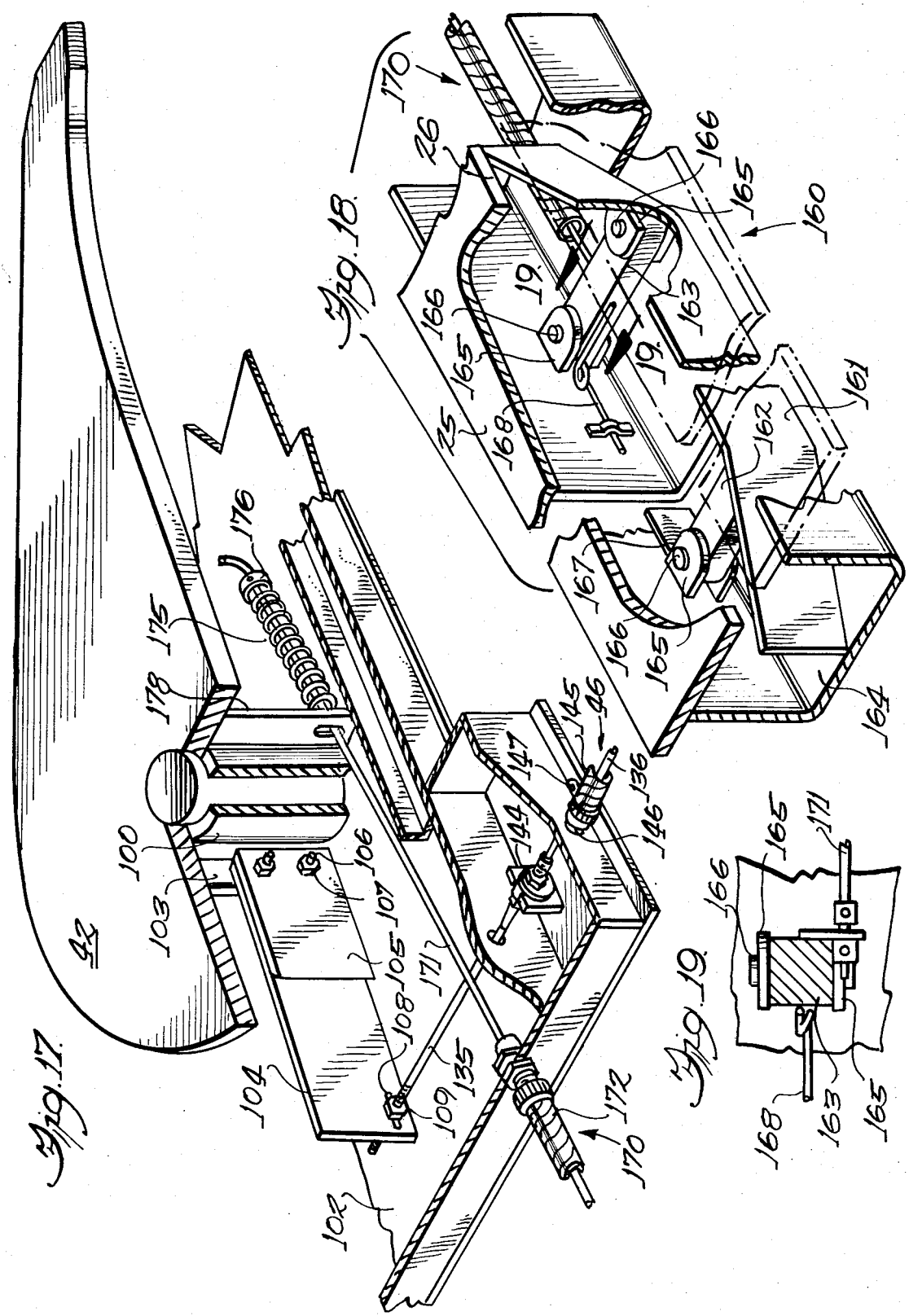

TRUCK TOW CONVEYOR SWITCHING APPARATUS

BACKGROUND OF THE INVENTION

1. Field of the Invention

The truck tow conveyor switching apparatus of the present invention finds its use in an automated conveyor system widely used to mechanize freight handling warehousing and industrial operations. The conveying system is a continuous, automatic and versatile conveying medium for moving platform trucks or the like, coded for a preselected destination, over a loop or an irregular shaped path having a number of branch sidings or spurs. The trucks have a vertically movable tow pin that projects through a slot in the floor surface to engage an endless powered chain below the floor surface and to thereby propel the trucks along the main line. The trucks are further provided with coding probes that engage reader heads projecting slightly above the floor surface. When two reader heads are rotated by the proper probes, a motion translator device actuates a switch at the intersection of the main line and the preselected spur line to automatically divert the truck into the spur line.

2. Description of the Prior Art

Mechanical switching systems for in-the-floor truck tow conveyors having trucks supporting code probes for engagement with mating floor cams or reader heads that actuate the switch to divert trucks from the main line into a spur have been used previously. In general some systems are used with single reader heads but many are adaptable to the use of two or more reader heads so that a much greater number of separately coded spurs may be used. In most cases the switch plates are spring biased and are latched at the switch so that the properly coded probes trigger the reader heads to release the latch so the switch plate then moves from one position to the other position. The operation of the floor cams or reader heads for these switching systems may be further separated into four classes.

In the first class, the code cams are fixedly supported on the floor surface on which the truck moves. Typical examples of this type are shown in U. S. Pat. No. 3,126,838 issued to L. Bradt and U. S. Pat. No. Re. 25,723 issued to L. Bradt et al.

In the second class, the code cams are biased to normally protrude above the floor level. Typical examples of this type are shown in U. S. Pat. No. 3,103,183 issued to L. Bradt et al., U.S. Pat. No. Re. 25,723 issued to L. Bradt et al., and U. S. Pat. No. 3,174,439 issued to D. M. Edgar et al.

In the third class, the code cams are biased to normally protrude above the floor level but may also be depressed without actuating the switching mechanism when accidentally contacted by other objects, such as a fork lift truck. Typical examples of this type are shown in U. S. Pat. No. 3,261,300 to G. K. Johnson, U. S. Pat. No. 3,388,674 to J. G. Dorrance, U. S. Pat. No. 3,406,638 to E. C. Braun, U. S. Pat. No. 3,481,281 to G. K. Johnson et al., and U. S. Pat. No. 3,538,853 to C. A. Dehne. A copending U. S. application Ser. No. 62,762 filed July 17, 1970, now abandoned discloses a mechanical switching system of this general type with multiple reader heads. The apparatus of the present invention belongs to this third class described above.

In the fourth class, the code cams are normally held below the floor level, but are raised above the floor for actuation by a code probe when a truck approaches the reader head. Typical examples of this system are shown in U. S. Pat. No. 3,127,849 to P. Klamp, U. S. Pat. No. 3,418,944 to W. W. Hansford et al, U. S. Pat. No. 3,418,945 to N. R. Stevenson et al, U. S. Pat. No. 3,503,335 to L. J. Bishop and U. S. Pat. No. 3,541,963 to K. R. M. Karlstrom.

SUMMARY OF THE INVENTION

In an in-the-floor truck conveyor system, a continuous main slot in the floor surface on which the truck moves provides a guide and a communicating channel for a vertically reciprocable tow pin mounted on the truck to engage a pusher link in a powered endless chain located directly beneath the slot. The main slot is intersected along its path at selected stations by spur slots and adjacent to each intersection is a switch plate for selectively diverting properly coded trucks into the spur slots. The switch plate is operative between a normally spur-line-closed position and a second position in which the spur-line is open and the main-line is closed. Disposed upstream from each switch plate are two reader heads which serve to actuate the associated switch plate through a motion translator device and rotate the switch plate from its normally spur-line-closed position to a spur-line-open position whereby an oncoming truck will be diverted into the spur slot. The use of two or more reader heads will provide for many more coded positions than is possible with a single reader head system. As the truck passes the switch plate, subsequent to entering the spur slot, the tow pin on the truck contacts a cam surface on the switch plate which functions to return the switch plate to its spur-slot-closed position.

Each code reader head is a substantially hemispherically shaped trigger rotatably mounted in a pivoted frame adjacent the main slot to normally protrude above the floor. The reader head is equipped with a latch, also pivoted on the reader head frame, matingly received in a pocket in the reader head to prevent accidental rotation of the reader head. The reader head further has a pocket and an upper abutment surface formed in its upstream side for releasably catching a coded probe depending from the truck after the latch is released. The lower side of each reader head has a depending lug to which a push-pull cable is secured and a lower abutment surface for mating with a lower portion of the latch to prevent rotation of the reader head. Thus the code probe first contacts the pivoted latch to release it and then engages the upper abutment surface of the reader head to rotate the reader head and tension the push-pull cable.

An improved motion translator assembly is provided intermediate the reader heads and the switch plate for translating reader head movement into switch plate opening only when both of the associated reader heads have been tripped simultaneously. Each push-pull cable from the two reader heads is connected to the input side of the translator assembly and a single push-pull cable is connected from the output side of the translator assembly to the switch plate. The translator assembly permits either one of the reader heads to be actuated without causing motion on the output cable, but simultaneous actuation of two reader heads and their respective cables is required to move a translator disk linearly to tension the output cable and thereby rotate the switch plate.

The above translator device is an improvement of the translator assembly used in the aforementioned switching apparatus of co-pending U. S. application Ser. No. 62,762. In the latter application the motion from the rotation of the reader heads is first used to pull the pivoted push bars in the translator which in turn move the actuating bar to which the output cable is attached. Actuation of one reader head is enough to partially move the actuating bar and the output cable but simultaneous actuation of two reader heads is necessary to provide full motion of the output cable. The output cable motion moves the switch latch block to release the switch latch and upon further motion rotates the switch plate. Thus the latch, to prevent accidental switch plate movement, is located at the switch plate itself.

In the present invention the reader heads themselves are latched so their rotation and rotation of the switch plate are prevented until two code probes engage proper reader heads to unlatch these reader heads. Then the unlatched reader heads are free to rotate and their rotation actuates the input cables on the improved translator. Only simultaneous actuation of the two input cables results in movement of the output cable. The motion of the output cable then operates the switch plate directly. This new system is thus simpler, less critical and more reliable. The improved system also provides for over-travel motion of the output cable at the switch plate so more latitude is available in the length of motion of the output cable relative to the amount required to rotate the switch plate. Because of the over-travel, the adjustments in the mechanism are not critical.

The switching apparatus of this invention is also provided with a control device to indicate that the spur slot is full of trucks. When the proper reader heads are activated by code probes to divert a truck into the spur slot and the spur slot is already full, the control device will permit the switch plate to rotate to the open position but will then immediately cause the switch plate to return to its spur-slot-closed position. Thus the truck is prevented from entering a full spur slot and a jam-up is prevented as the truck continues along the main slot.

Accordingly, it is an object of this invention to provide an improved switching apparatus in a truck tow conveyor system.

Another object is to provide an improved motion translator device which will not translate movement to the switch plate and will prevent accidental operation of the switch plate unless two code probes actuate their respective reader heads at substantially the same time.

Another object is to provide a latch directly on each code reader head that will prevent the reader head from rotating and the motion translator device from being accidentally actuated to move the switch plate except by two properly coded probes acting substantially at the same time.

Another object is to provide means on the switch blade that is simple and reliable but will permit over-travel motion of the actuating cable when receiving actuation from multiple reader heads.

Still another object is to provide a full-spur control device operable in conjunction with the motion translator to prevent a switch from diverting a truck when there is no more space in the spur for another truck.

The manner in which these and other objects of the invention may be obtained will be apparent from the following detailed description and the accompanying drawings.

BRIEF DESCRIPTION OF THE DRAWINGS

FIG. 1 is a perspective view of part of the truck tow system, showing two switches and a truck which is used in the system.

FIG. 2 is an enlarged plan view of one embodiment of the switching apparatus of the present invention, wherein two reader heads are used to actuate the switch through a motion translator device.

FIG. 3 is an enlarged fragmentary elevational view, showing the chain and pusher used for towing the trucks.

FIG. 4 is an enlarged fragmentary plan view of the chain and pusher, showing how the truck tow pin is disengaged from the pusher when desired, the view being taken on line 4—4 of FIG. 3.

FIG. 5 is an enlarged longitudinal central section through the reader head assembly, the translator assembly and switch plate, taken on line 5—5 of FIG. 2.

FIG. 6 is an enlarged elevational section of the translator assembly of FIG. 5.

FIG. 7 is a cross-sectional view of the translator assembly taken on line 7—7 of FIG. 6.

FIG. 8 is a cross-sectional view of the translator assembly, taken on line 8—8 of FIG. 6.

FIG. 9 is a cross-sectional plan view of the translator disk and its pivot shaft, taken along line 9—9 of FIG. 6.

FIG. 10 is a plan view of the translator assembly in its neutral position.

FIG. 11 is a plan view of the translator assembly, showing its position with one reader head actuated.

FIG. 12 is a plan view of the translator assembly, showing its operative position when two reader heads are actuated simultaneously.

FIG. 13 is an elevational section of the reader head, showing the latch released by the code probe before rotation of the reader head.

FIG. 14 is an elevational section of the reader head, showing the latch released and the code probe rotating the reader head.

FIG. 15 is an elevational section of the reader head, showing the maximum rotation of the reader head with the latch engaging the lower projection of the reader head.

FIG. 16 is an elevational section of the reader head and its pivotable support, showing the support pivoted to a slightly depressed position so the code probe is released and the reader head is in its actuated position.

FIG. 17 is a fragmentary perspective view of the switch plate, showing the relative location of the respective parts.

FIG. 18 is a fragmentary perspective view of the control device that prevents entry of additional trucks when the spur is full.

FIG. 19 is a sectional view taken on line 19—19 of FIG. 18.

FIG. 20 is a sectional view of the pivoted reader head assembly taken on line 20—20 of FIG. 2.

DESCRIPTION OF THE PREFERRED EMBODIMENTS

The switching apparatus of the present invention, generally designated 20 in FIGS. 1 and 2, finds its primary use in a truck tow system, wherein trucks or dollies 22 are towed by a power driven chain 23 (FIG. 3) along an endless slot 24 in a reference surface, such as the floor 25 of a warehouse. The main slot is intersected at preselected spaced intervals by spur slots 26, which define stations generally designated 27 and 28 and at which stations selected trucks may be diverted by the switching apparatus 20.

A typical truck 22 is shown in FIG. 1 while being towed down the main slot 24. Near the forward end of the truck 22 is mounted a vertically slidable tow pin 30 which is manually movable between a lowered operative position, as shown in FIGS. 1 and 3, with the lower end of the tow pin beneath the floor 25 and a raised inoperative position. The tow pin 30 is moved to its inoperative position by raising it within sleeve 31 by means of handle 32 so that the lower end of the tow pin is above the floor level. To leave the tow pin in its raised inoperative position, the handle 32 is merely rotated above the sleeve until it will not slip down into the slot 33. In the tow pin's lowered operative position, its lower end releasably fits into a pocket 35 (FIGS. 3 and 4) in a pusher link 36 of the chain 23 such that when the truck 22 has been diverted into a spur slot 26, by the switching apparatus 20, the tow pin will easily slide laterally along the face of the pusher dog 37 and out of pocket 35 to pass freely down the spur slot 26. The pusher link 36 is attached at spaced intervals in chain 23. The chain moves directly beneath the main slot 24 to propel the trucks along. However, when the truck 22 has been diverted from the main slot 24 into the spur slot 26, the truck is no longer towed by the chain 23 because the tow pin 30 slides out of engagement with the pusher link 36 and the chain follows a path beneath the main slot 24. The spur slot 26 may be non-powered and the truck proceeds away from the switching area under its own momentum or by gravity under a sloping floor or it may be powered by a second chain under the spur slot.

Disposed on the truck, in alignment transversely of the truck with the tow pin 30, are a series of probes 39 which are mounted in a manner similar to the manner in which the tow pin 30 is mounted. They are manually movable from a lower operable position, wherein the lower end of the probe is slightly elevated from the floor 25 to a raised inoperable position. In their lower operable position the probes serve to trip reader heads 40 and 41, which actuate the switching apparatus 20, as will be explained more fully later. The probes 39 are located on both sides of the tow pin and are lettered so that particular trucks can be coded by lowering a selected probe into operable position. For example, the 24 probes illustrated can be lettered A to X and probes A and J could be lowered to their operable position, leaving probes B to I and K to X in their raised inoperable position. This particular truck would then be coded AJ and could then be automatically sent to a station, such as the one generally indicated by reference numeral 27, which is also coded AJ by the spacing of the associated reader heads 40 and 41 laterally from main line slot 24. The manner in which the truck is diverted from the main slot 24 at station 28 by the switching apparatus 20 will become clear with the detailed description below.

The switching apparatus 20 basically comprises the reader heads 40 and 41, a switch plate 42, a motion translator assembly 43 and three flexible push-pull cables 44, 45 and 46, which operatively connect the reader heads, the translator assembly and the switch plate. As best shown in FIG. 2, when a truck 22 progresses down main slot 24 in the direction of the arrow, it will trip reader heads 40 and 41, if it is coded to be diverted into the associated spur slot 26. The reader head 40 rotates as the truck passes thereover and pulls the input cable 44. The reader head 41 rotates as the truck passes thereover and pulls the input cable 45. The simultaneous actuation of cables 44 and 45 on the translator assembly 43 pulls the output cable 46, which functions to rotate switch plate 42 from the spur-slot-closed, full line position of FIG. 2 to the spur-slot-open, phantom line position whereby the tow pin 30, depending from the truck 22, will be diverted into the spur slot 26. The operation of the translator assembly 43 will be described in more detail later.

Reader heads 40 and 41 are identical so only one unit will be described. The entire reader head assembly, generally designated 50 in FIG. 5, is mounted in a housing 51 having a cover plate 52 with an aperture 58 through which the reader head 40 protrudes above the floor surface 25. The cover plate 42 is secured to the housing 51 with two flat head cap screws 53 and nuts 54. The reader head 40 is a generally hemispherically shaped unit with two arms 55 depending from the bottom thereof to receive one end of the push-pull cable 44 and in addition the reader head is equipped with a pivoted latch member 56. The reader head 40 is rotatably mounted on a horizontal shaft 57 and the latch 56 is pivotally mounted on a horizontal shaft 59, both shafts extending between two arms of a bracket 60 at one end of the bracket. Bracket 60 is pivotally mounted at the other of its ends in housing 51, as will be described more fully later. A pocket 62, having an abutment surface 63 and a width slightly greater than the diameter of the probes 39, is cut in the top and forward surface of the hemispherical portion of the reader head 40. A slot 64, narrower in width than the diameter of the probes 39, is further provided in the reader head 40 deeper into pocket 62 to receive the pivoted latch 56. The lower end of probe 39 first contacts latch 56, rotating it counterclockwise to release it from its latched position, and then engages abutment surface 63, rotating the reader head 40 counterclockwise, as shown in FIGS. 13 to 15, about the shaft 57. Before the probe 39 can ride off the top of abutment surface 63 of reader head 40, the reader head is depressed into the housing slightly by the pivoting of bracket 60, as shown in FIG. 16. The push-pull cable 44 is secured to a spring type hollow pin 65 which extends between the two depending arms 55 of the reader head and is pivotable therein. Therefore, as reader head 40 is rotated counterclockwise by the probe 39 moving from right to left, the two depending arms 55 of the reader head 40 are moved generally from left to right, as viewed in FIGS. 13–16, pulling cable 44 which moves actuator member 47 of the translator assembly 43, as will be described later.

The pivoted bracket 60, as shown in FIG. 5, comprises two longitudinal side members 70, pivot pin 71, a lower stop bar 72, an upper stock bar 73, a transverse tie bar 74, a pair of upper resilient bumpers 75 and a pair of upper spring guides 76. Transverse bar 74 ties the two outer ends of side members 70 together and pivot pin 71 secured in the pivot end of these side members completes the rectangular frame work forming this pivoted bracket. Bumpers 75 consist of a rectangular piece of sponge rubber or soft rubber strip cemented to the top of member 74 to act as a resilient cushioning member in the seating of the free end of the pivoted bracket against the underside of the cover plate 52. Adjacent to transverse bar 74 a hole is provided in each side member 70 to receive the horizontal shaft 59 for the pivoted latch 56 and a hole located in alignment with the center of reader head 40 is provided in each side member 70 to receive the horizontal shaft 57 for the reader head. Between the reader head pivot shaft 57 and the latch pivot shaft 59, bar 73 is welded to each side member 70 near their top edge which forms an upper stop for the pivoted latch 56. Adjacent to the reader head 40 bar 72 is welded to each side member 70 near their bottom edge, which forms a stop for the rearward end of the two depending arms 55 of the reader head. Stop member 72 retains the reader head 40 from exceeding its normal upright position and stop member 73 retains the latch 56 from rising above the outer circumferential surface of the hemispherical portion of reader head 40. The pivot pin 71 of bracket 60 is supported in a sleeve 77 welded to a horizontal plate 78 which is removably secured to a transverse support plate 79 welded to the sides of housing 51. Bolts 80, nuts 81, washers 82 and spacer plate 83 are used to fasten plate 78 to transverse support plate 79. Between the reader head pivot shaft 57 and the upper stop bar 73 a spring guide 76 is welded to the outer side of each side member 70, as shown in FIGS. 5 and 20. Vertically below the spring guides 76 a lower pair of spring guides 84 are welded to the bottom of housing 51. A spring 61 is mounted between the upper guide 76 and the lower guide 84 on each side of side members 70 to resiliently support the pivoted bracket 60.

To prevent an inadvertent tripping of a reader head, and thereby an incorrect switch plate movement, by means other than a probe 39, the pivoted latch 56 is provided within the reader head 40 itself, as shown in FIG. 5. The latch 56 comprises a rearwardly facing curved central member 90 having a forward extension 91 for the pivot shaft 59. A sleeve 92 extends transversely from each side of extension 91 and mounts over shaft 59 to provide pivotal movement of latch 56. A transverse arcuate shaped plate 93 is provided in the top surface of the curved central member 90 to provide greater width than the thickness of the central member 90 for the probe 39 to engage the latch. A square stop bar 94 is attached to the bottom of rearwardly facing curved central member and extends tranversely of the thickness of this central member 90. A cylindrical pin 95 is welded to the central plate 90 below and slightly to the rear of pivot sleeve 92. A torsional spring 96 is wound around pivot sleeve 92 with one of its ends extending under transverse bar 74 and the other end extending under pin 95 as spring stops. The latch 56 is pivotally mounted on pivot pin 59 so that the curved central member 90 projects within slot 64 and the plate 93 and stop bar 94 project only within pocket 62 of the reader head 40. In the normal position of reader head 40, as shown in FIG. 5, the stop bar 94 prevents rotation of reader head 40 because the transverse ends of stop bar 94 extend beyond slot 64 but are within the lower end of pocket 62. When the latch 56 is released by a probe 39, as shown in FIG. 13, the latch pivots counterclockwise so that the stop bar 94 is out of and below pocket 62, thus releasing reader head 40 so it can rotate. The reader head is free to rotate until stop bar 94 contacts the forward end of the two depending arms 55 of the reader head, as shown in FIG. 15. Thereafter, the bracket 60 pivots downwardly, as shown in FIG. 16, to permit the code pin 39 to advance past the reader head.

Push-pull cable 44 is operatively connected from reader head 40 to the actuator member 47 of the motion translator assembly 43, as shown in FIG. 5. The push-pull cable 44 consists of an inner core 66 and an outer casing 67. The end of the outer casing 67 nearer the reader head 40 is clamped in an upright slotted support member 68 secured to the housing 51 and only the movable inner core is connected to the reader head. Push-pull cable 45 is operatively connected to reader head 41 and the actuator member 48 in the same manner as cable 44.

The motion translator assembly 43 comprises a U-shaped base 110, the actuator member 47 associated with reader head 40, an actuator member 48 associated with reader head 41, an angle bracket 111, a clevis 112, a vertical pin 113, a horizontal translator disk 114 and a pair of springs 115, as shown in FIGS. 6–10. The base 110 has an upright flange 116 on one end which contains a pair of open vertical guide slots 117 spaced from the centerline and an upright flange 118 on the other end which contains a second pair of open vertical guide slots 119 aligned with slots 117 plus a central open slot 120. Actuator members 47 and 48 are alike except for having right and left hand end flanges so only member 47 will be described. Actuator member 47 is a flat bar with a flange 121 at one end bent at right angle to the main portion of the bar. This end flange has a central hole 122 and an upper hole 123. The main portion of actuator members 47 and 48 fit in slots 117 and 119 so as to freely slide therein in parallel relationship and be guided thereby in a linear direction parallel to the longitudinal axis of the base. As shown in FIGS. 8 and 10, each actuator member 47 and 48 further has a guide block 126 with a tapered end welded to the inner vertical side of the main portion of the member about at its mid-height and adjacent the end opposite the end flange 121. The vertical leg of angle bracket 111 is welded to clevis 112 so that its horizontal leg projects above the top of the clevis. A central hole 128 is provided in the vertical leg of bracket 111 and two holes 129 are provided in the horizontal leg, spaced from the longitudinal central axis and in alignment with the upper holes 123 in the end flange of the actuator members 47 and 48. One of the springs 115 is secured to hole 129 in bracket 111 and to a cotter pin 130 in hole 123 of the end flange 121. The other spring 115 is secured to actuating member 48 and bracket 111 in a similar manner. Springs 115 normally bias members 47 and 48 so the actuators return to their neutral position and guide blocks 126 abut angle bracket 111. Clevis 112 has a central horizontal threaded hole 132 and a vertical hole 133 through its forked ends. Output push-pull cable 46 has an inner core 135 which passes through slot 120 in base flange 118 and hole 128 in angle bracket 111 and is threaded into hole 132. This assembly is further locked by nut 137 on the threaded portion of core 135, as shown in FIG. 9. Pin 113 passes through the vertical hole 133 in clevis 112 and rests on base 110. Translator disk 114 is welded to pin 113, as shown in FIG. 9, between the forked ends of the clevis so the pin 113 and translator disk 114 are free to pivot in hole 133 of the clevis. In the normal, inoperative positions of the translator assembly 43, as shown in FIG. 10, the translator disk 114 is located so that the centers of pin 113 and disk 114 are positioned on the longitudinal centerline of base 110. The diameter of disk 114 is greater than the span between guide blocks 126 on actuator members 47 and 48 so the simultaneous movement of members 47 and 48 force the guide blocks 126 to push the disk 114 along the central longitudinal axis, whereas movement of only one actuator will merely cause disk 114 to pivot in clevis 112.

The output push-pull cable 46 from the translator assembly 43 is operatively connected to the switch plate 42, as shown in FIGS. 2, 5, 6 and 17. Push-pull cable 46 has an outer casing 136 which is supported in a slotted upper support 142 in a housing 143 for the translator assembly and a second slotted upright support member 144 in switch housing 102. The movable inner core 135 extends beyond support 144 to the switch plate. Since the push-pull cable 46 is usually buried and inaccessible in the distance between the motion translator housing 143 and the switch plate housing 102, the cable is usually placed in a protective flexible hose 145 between these housings so the cable may be removed if necessary. The hose is clamped to a short metal tube 146 welded over the cable opening in each housing with hose clamps 147 (FIG. 17).

The switch plate is rotatably mounted on a vertical tubular column 100 secured to a switch plate housing 102, as shown in FIG. 17. A vertical bar 103 depends from the underside of switch plate 42 adjacent to column 100 and is secured to the switch plate. A flexible spring plate 104 is clamped between bar 103 and a plate 105 with bolts 106 and nuts 107. The outer vertical edge of bar 103 and plate 105 adjacent to spring plate 104 is rounded to permit the spring plate to flex without creating a stress raiser at the point of bending. The spring plate 104 extends radially out from pivot column 100 approximately parallel to the spur slot 26 and on the opposite side of column 100 from the main line slot 24. Near the outer end of spring plate 104 and in alignment with the push-pull cable 46 a slotted hole 108 is provided. The threaded end of inner core 135 of push-pull cable 46 is inserted through the slotted hole 108 and secured to the spring plate 104 with a locknut 109 on each side. Clamp plate 105 is wider than bar 103 so that the free length and thereby the spring force of spring plate 104 is different when bending to one side from the other. Spring plate 104 is made flexible so that it permits some over-travel of the push-pull cable 46 after the switch plate 42 is seated in its floor plate openings at either its spur-slot-open or spur-slot-closed position. When the translator assembly output cable 46 is actuated to open switch plate 42, it pulls against the shorter and stiffer end of spring plate 104 so the switch plate moves more quickly and with less flexing. Likewise, when the tow pin 30 is in the spur slot 26 and engages a cam surface 101 on the rear of the switch plate while the switch plate is in the spur-slot-open position, the switch plate will return to the spur-slot-closed position more quickly because the wider clamp plate 105 is pushing spring plate 104. The latter will then return to its original position with less flexing and pull the push-pull cable 46 with it. In the case of an accidental movement of switch plate 42 from its spur-slot-closed position to its spur-slot-open position by some outside force, as by some projection on a fork lift truck catching in the switch plate, and with no corresponding movement of the translator output cable 46, the longer free end of spring plate 104 will permit it to flex easily in this direction without damage, since plate 104 bends about narrow bar 103. Then the spring plate 104 returns the switch plate to its original position after the removal of the outside force.

In operation, when proper probes 39 on the truck actuate the correspondingly positioned reader heads 40 and 41, the rotation of the reader head will pull the translator input cables 44 and 45 and the translator output cable 46 from left to right, as shown in FIGS. 5 and 12. This will pull spring plate 104 and cause the switch plate 42 to pivot from its spur-slot-closed position to its spur-slot-open position, as shown in phantom lines in FIG. 2. The tow pin 30 and truck 22 are then diverted into spur slot 26. It is to be further noted that reader head 40 and reader head 41 may be on opposite sides of the main spur slot 24, as indicated in FIG. 1 for Station 28, depending upon the positions of the selected code probes 39.

The three operative positions of the motion translator mechanism are shown in FIGS. 10–12. In FIG. 10 the unit is in its neutral position with actuator members 47 and 48 fully drawn back with guide blocks 126 abutting angle bracket 111. The center of translator disk 114 is in alignment with the longitudinal centerline A of the base 110 equidistant between the actuator members 47 and 48 and guide blocks 126. In FIG. 11 the position of actuator member 48 is shown extended to the right, from its neutral position, having been pulled there by cable 45 after actuation of reader head 41 by probe J. With the extension of actuator member 48 in base 110, its guide block 126 has moved away from base flange 118. Actuator member 47 remains in its neutral position with its guide block 126 adjacent to the base flange 118. The movement of actuator member 48 to the right pivots translator disk 114 with its shaft 113 in clevis 112 to an angle away from the longitudinal centerline of translator base 110 without causing any linear movement of the clevis itself nor the output cable 46. Thus, there is no rotation of the switch plate 42. In FIG. 12 both actuator members 47 and 48 are shown extended to the right from their neutral position by the simultaneous right actuation of reader heads 40 and 41 and their respective cables 44 and 45. Since both guide blocks 126 on members 47 and 48 move away from their neutral position adjacent base flange 118, translator disk 114 is also pushed along the centerline of the base 110 by these guide blocks, since the space between these blocks is less than the diameter of disk 114. In so moving the translator disk pivot pin 113 also pulls clevis 112 away from base flange 118 to the right and imparts a linear motion to output cable 46 fastened to the clevis. The motion of cable 46 then rotates switch plate counterclockwise from its spur-slot-closed position to its spur-slot-open position so that a truck can be diverted into spur slot 26.

The simultaneous actuation of the reader heads or the simultaneous movement of the actuating members to obtain linear movement of the translator disk is defined as that short period during which two reader heads are actuated by two code probes and the second reader head is actuated at least prior to the release of the first code probe from the first reader head. This condition might arise when the code probes are bent or slightly out of transverse alignment across the front of the truck.

Cam surface 101 formed on a rearward portion of switch plate 42 presents an abutment surface across the spur when the switch plate is in its open position. The tow pin 30 of a truck that has been diverted into the spur slot 26 will engage the cam surface 101 and thereby rotate the switch plate during the tow pin's passage past the switch plate to return the switch plate to its spur-slot-closed position, shown by solid lines in FIG. 2. Other trucks will thus not be diverted by the switch plate unless their code probes again actuate the associated reader heads 40 and 41.

A control device, generally designated 160 in FIGS. 2 and 18 and hereinafter referred to as a full-spur device, is provided to prevent more than a predetermined number of trucks 22 from entering a spur slot. This is necessary to prevent a jam-up of the truck tow system whereby too many trucks are diverted into one spur slot 26, causing at least one truck to block main slot 24. The full-spur device 160 is pivotally mounted below the floor 25 at a point far enough along the spur slot 26 that a truck with its tow pin 30 engaging the device will not block other trucks moving in the main slot 24. The full-spur device 160 is a three bar parallel linkage cam which includes bar 161 projecting into the spur slot 26, and parallel links 162 and 163 which connect the bar 161 to a housing 164 in which the device is mounted. The links 162 and 163 are pivotally connected to the housing 164 as well as to the bar 161 by brackets 165 and pins 166 forming a parallelogram linkage, so that as the tow pin 30 of a truck 22 contacts the bar 161 it will swing out of the way of the tow pin, with the links 162 and 163 swinging clockwise from their normal position, as shown in FIG. 18. A stop 167, projecting from one end of link 162, prevents the parallel linkage cam from rotating counterclockwise from its normal position by abutting against one side wall of housing 164. To retain the cam in its normal position, except when a tow pin 30 occupies the spur slot 26 adjacent the cam, a torsion spring 168 is provided to bias the link 163 in a counterclockwise direction, forcing stop 167 against housing 164. A fourth push-pull cable 170 operably connects the full-spur device 160 to the switch plate 42. One end of a movable inner core 171 of the push-pull cable 170 is secured to link 163 of the full-spur device and the other end supports a coil compression spring 175, as shown in FIG. 17. An outer casing 172 for the push-pull cable 170 is clamped at each of its ends to the switch plate housing 102 and the full-spur device housing 164. Spring 175 abuts a collar 176 fastened at one end of the inner core 171 of push-pull cable 170 and has its other end abutting a bar 178 depending from switch plate 42. Bar 178 is secured to the switch plate and has an aperture therein through which core 171 of the push-pull cable 170 passes.

It can be seen that, when the full-spur device 160 is contacted by a tow pin 30 of a truck 22, the bar 161, which is approximately as long as a truck, is forced toward the housing 164 out of the spur slot 26, causing links 162 and 163 to rotate in a clockwise direction to pull the inner core 171 of cable 170. When the inner core 171 is pulled, spring 175 is compressed and it biases switch plate 42 in a clockwise direction, thereby tending to maintain the switch plate in a closed-spur-slot position so that no further trucks will be diverted into the spur slot. If, while spring 175 is compressed, another properly coded truck 22 in main slot 24 trips the reader heads 40 and 41 to activate the switch plate, the switch plate will actually open but due to the added resistance of spring 175 as bar 178 rotates counterclockwise, it will immediately close again as the probes 39 release the reader heads 40 and 41 and before the truck reaches the switch plate. That truck will then remain in the main slot 24 until the full-spur device 160 is deactivated by the withdrawal of a truck in the spur slot and the compression in spring 175 is released. It should be stated that main slot 24 is continuous so that a truck 22, which was prevented from entering its predestined spur slot 26, will eventually come by the spur slot again at which time it could be diverted into the spur slot if the spur slot is no longer full.

Although the best mode contemplated for carrying out the present invention has been shown and described herein, it will be apparent that modification and variation may be made without departing from what is regarded to be the subject matter of the invention.

What is claimed is:

1. A motion translator for use in a truck tow conveyor system having a plurality of switching means for diverting a truck to a selected spur line, said truck having a first code means and a second code means corresponding to the designated code of one of said switching means, the combination comprising:
   a. a first actuator having an abutment portion movable along a first path;
   b. a second actuator having an abutment portion movable along a second path;
   c. a support member movable along an intermediate path between said first and second paths;
   d. a translator pivotally mounted on said support member, said translator wider than the span between said abutment portions when said abutment portions are opposite each other;
   e. means operable in response to said first code means to move said first actuator, said translator pivoted out of the path of the abutment surface on the first actuator without moving said support member if the second actuator is not moved;
   f. means operable in response to said second code means to move said second actuator, said translator pivoted out of the path of the abutment surface on the second actuator without moving said support member if the first actuator is not moved, said translator and support member moved along said intermediate path by both abutment surfaces if and only if said first and second actuators are moved simultaneously; and g. means responsive to movement of said support member along said intermediate path to throw said switching means.

2. A motion translator for use in a truck tow conveyor system having a plurality of switching means for diverting a truck to a selected spur line, said truck having a first code means and a second code means corresponding to the designated code of one of said switching means, said motion translator comprising in combination:

a. a first actuator having an abutment portion movable along a first path;
b. a second actuator having an abutment portion movable along a second path;
c. a support member movable along an intermediate path between said first and second paths;
d. output connecting means operatively linking said support member and said switching means;
e. a translator pivotally mounted on said support member, said translator being wider than the span between said abutment portions when said abutment portions are opposite each other;
f. first input means connected to said first actuator to move the first actuator in response to said first code means, said translator pivoted out of the path of the abutment portion o on the first actuator if the second actuator is not moved and said translator thereby ineffective to move said output connecting means; and
g. second input means connected to said second actuator to move the second actuator in response to said second code means, said translator pivoted out of the path of the abutment portion on the second actuator if the first actuator is not moved, said translator and said support member effective to move said output connecting means and to throw said switching means when said translator and said support member are moved along said intermediate path by both abutment portions if said first and second actuators are moved at substantially the same time.

3. A motion translator for use in a truck tow conveyor system having a plurality of switching means for diverting a truck to a selected spur line, said truck having a first code means and a second code means corresponding to the designated code of one of said switching means, said motion translator comprising in combination:

a. a base;
b. a first and a second actuator guidingly supported on said base in spaced relationship for parallel movement, each actuator having an abutment surface;
c. a support member movable along a path intermediate the paths of movement of said first and second actuators;
d. output connecting means operatively linking said support member and said switching means;
e. a translator pivotally supported in said support member, the transverse dimension of said translator being greater than the span between the abutment surfaces of said first and said second actuators, when they are opposite each other;
f. means operable in response to said first code means to move said first actuator, said translator pivoted out of the path of the abutment surface of said first actuator without moving said support member and said output connecting means if the second actuator is not moved; and
g. means operable in response to said second code means to move said second actuator, said translator pivoted out of the path of the abutment surface of said second actuator without moving said support member and said output connecting means if the first actuator is not moved, said translator and said support member moved along said intermediate path in a linear direction by both abutment surfaces only if said first and said second actuators are moved simultaneously to thereby move said output connecting means and to actuate said switching means.

4. A motion translator for use in a truck tow conveyor system having a reference surface on which the truck moves, a switching plate for diverting a truck with a plurality of code probes from a main slot in the reference surface to a preselected spur slot intersecting the main slot, and at least two reader heads actuated by the code probes, said motion translator comprising in combination:

a. a base having an upright flange at each end, each flange having a pair of vertical slots equidistant from the longitudinal axis of said base;
b. two actuating members supported in the vertical slots of said base flanges, for parallel movement;
c. two guide bars, each guide bar attached to the inner side of each of said actuating member adjacent the longitudinal axis of said base;
d. two flexible input connecting means, each of which is attached to one reader head on one end and to one of said actuating members on the other end;
e. flexible output connecting means attached to said switch plate;
f. a clevis member attached to said output connecting means at the end opposite to the switch plate, said clevis member movable along the longitudinal axis of said base; and
g. a motion translator disk pivotally supported in the forked ends of said clevis member, the diameter of said disk being larger than the span between said guide bars when they are opposite each other, said translator disk being moved by said guide bars in a linear direction to actuate said output connecting means in response to actuation of both input connecting means at substantially the same time and said translator disk pivoting in said clevis member without moving said output connecting means in response to actuation of either one of said input connecting means.

5. The motion translator of claim 4, wherein the motion translator disk is a horizontal cylindrical body and further includes a vertical pin welded to the peripheral edge of said disk so that said disk is in vertical alignment with said guide bars.

6. The motion translator of claim 5, further comprising bias means between each of said actuating members and said clevis member to normally urge each actuating member to return to its inoperative position upon disengagement of the reader head by the code probe.

7. The motion translator of claim 6, wherein the clevis member includes a bracket extending above the top portion of said clevis, wherein each of said actuating members has a flange to which said input connecting means is attached, and wherein said bias means comprises a pair of extension springs cooperatively connected between said clevis bracket and the flange of each actuating member.

8. A switching apparatus for use in a truck tow conveyor system having a continuous main slot in a reference surface for guiding a truck having at least two code probes, said system having at least one spur slot in said surface intersecting said main slot for accepting trucks diverted from said main slot, said switching apparatus comprising in combination:
  a. a switch plate adjacent the intersection of said main slot and one of said spur slots, said switch plate being movable between a spur-slot-closed and a spur-slot-open position for physically diverting trucks in said main slot into the adjacent spur slot;
  b. at least two reader heads upstream of said switch plate adjacent said main slot projecting above said surface and responsive to the horizontal movement of at least two properly coded probes on the truck thereover to rotate said reader heads, each of said reader heads having an abutment surface formed in a pocket in its upwardly projecting surface to receive said code probe;
  c. latching means cooperatively mounted with each of said reader heads and arranged to contact the code probe prior to the engagement of the code probe with the abutment surface of said reader head to release said reader head for rotation; and
  d. motion translating mean operatively connecting said reader heads and said switch plate, said motion translating means responsive to rotation of at least two reader heads at substantially the same time by properly coded probes on the truck, said motion translating means including:
    1. at least two input connecting means operatively linking each of said reader heads to said motion translating means; and
    2. output connecting means operatively linking said motion translating means to said switch plate.

9. The switching apparatus of claim 8, wherein the motion translating means comprises a base; at least a pair of movable actuating members guidingly supported in a parallel relationship in said base and to which actuating members each of said input connecting means is individually attached; a movable output member attached to said output connecting means; and a translator member pivotably supported in said output member, said translator member movable in a linear direction in response to the simultaneous movement of said actuating members.

10. The switching apparatus of claim 9, wherein the motion translating means further comprises bias means between each of said actuating members and said output member to normally urge each actuating member to return to its inoperative position.

11. The switching apparatus of claim 9, wherein the translator member includes a horizontal cylindrical disk and a vertical pivot pin, said disk being welded to said pin at the peripheral edge of the disk.

12. The switching apparatus of claim 11, wherein each of said actuating members includes a guide bar attached to each of said actuating members adjacent said output member and the longitudinal axis of said base, the space between said guide bars being less than the diameter of said translator member when said guide bars are opposite each other whereby when both actuating members are moved forward by the actuation of said input connecting means, said guide bars push said translator member forward to move said output member in a linear direction along the longitudinal axis of said base and to actuate said output connecting means.

13. The switching apparatus of claim 8, wherein said latching means comprises a pivoted arm portion normally projecting above said reference surface to engage the code probe and a transverse bar attached to a lower portion in locking engagement with the lower surface of the pocket in said reader head to prevent accidental rotation of said reader head.

14. The switching apparatus of claim 13, wherein each of said reader heads further has a narrow centrally located vertical slot extending forwardly and more deeply into the reader head than the pocket, wherein said reader head is rotatably mounted in a pivoted support frame and wherein said latching means further comprises a relatively thin arcuate shaped forward arm portion matingly receivable in the central slot upon engagement with and pivoting under the horizontal movement of the codes probe, a rear portion including a horizontal sleeve and a horizontal pivot shaft within said sleeve secured in the outer end of said pivoted support frame, bias means on said sleeve for normally urging said forward arm portion to its upper operative position and a stop bar on said pivoted support frame to limit the upward travel of said forward portion of said latching means so as not to protrude above the outer surface of said reader head.

15. The switching apparatus of claim 14, wherein each of said reader heads further has at least one lug projecting below the lower outer surface, said lug has fastening means for one end of said connecting means, one end of said lug forward of the rotatable axis of said reader head has an abutment surface for engaging a lower transverse bar on said pivoted support frame to limit the rotation of said reader head, the other end of said lug has an abutment surface for engaging the transverse bar of said latching means to limit rotation of said reader head in the opposite direction when said latching means is released by the code probe.

16. The switching apparatus of claim 8, wherein said switch plate further comprises a flexible plate operatively associated with said switch plate to provide overtravel motion between said output connecting means and said switch plate, said output connecting means being fastened adjacent to the outer end of said flexible plate.

17. The switching apparatus of claim 16, wherein said flexible plate is clamped between a narrow bar attached to the underside of said switch plate and a wider clamping plate fastened to said narrow bar, the free end of said flexible plate extending appreciably beyond said wider clamping plate to provide a different spring rate in flexing in one direction from the spring rate in flexing in the opposite direction whereby the flexible plate is stiffer when the free end of the flexible plate is normally moved to rotate the switch plate from its spur-slot-closed to its spur-slot-open position and the flexible plate is less stiff when the clamped end of the flexible plate is pushed by the narrow bar as the switch plate is rotated to the spur-slot-open position by some outside force while the free end of the flexible plate and said output connecting means remain relatively stationary.

18. The switching apparatus of claim 8, wherein the switch plate further comprises a cam surface thereon for returning said switch plate to the closed position when contacted by the truck in the spur slot, said cam surface projecting into the spur slot when the switch plate is in the open position.

19. The switching apparatus of claim 8 further comprising a full-spur control means operatively associated with the switch plate for preventing more than a predetermined number of trucks from being diverted into said spur slot.

20. The switching apparatus of claim 19, wherein the full-spur control means comprises truck detecting means in the spur slot downstream of the switch plate, a full-spur connecting means operatively attached to said detecting means on end, spring means attached to the other end of said full-spur connecting means and an arm attached to the underside of said switch plate with which the spring means is operatively related to return said switch blade to a closed position when the full-spur connecting means is actuated by the full-spur control means.

21. In combination with a switching apparatus for a truck tow conveyor having a main slot and at least one spur slot in a reference surface, the truck having a plurality of code probes, a switch plate adjacent the intersection of said main slot and said spur slot operative between a closed and an open position, at least two pivotally supported rotatable reader heads projecting above the reference surface, operable by the code probes and located upstream of said switch plate, the improvement which comprises:

a. latching means cooperatively mounted with each of said reader heads and having a surface matingly received within each reader head to lock said reader head against rotation, said latching means having a portion located to contact the code probe prior to the engagement of the code probe with the reader head to release said reader head upon engagement with the code probe; and b. motion translating means located between said reader heads and said switch plate and operatively connected thereto, said translating means ineffective to actuate said switch plate in response to actuation of one reader head and effective to actuate said switch plate in response to actuation of both reader heads at substantially the same time.

22. The switching apparatus of claim 21, wherein the motion translating means comprises a base; at least two slide bars guidingly supported in said base in a parallel relationship spaced apart from the longitudinal centerline of said base; a guide bar attached to each of said slide bars; at least two input flexible cables, one of each cable attached to one end of each slide bar and connected at its other end to one of each reader head; an output flexible cable having an output member at one end located on the centerline of said base at the end of the base opposite that of the input cables, said output cable connected at its other end to said switch plate; and a translator block pivotably supported in said output member and cooperatively located between the guide bars on said bars whereby the output member and thereby the output cable will only be moved by the substantially simultaneous movement of said guide bars pushing said translator block upon the actuation of two reader heads.

23. The switching apparatus of claim 22, wherein said translating means further comprises bias means between each of said slide bars and said output member to normally urge each slide bar to return to its inoperative position upon disengagement by the code probe with its associated reader head.

* * * * *

PO-1050
(5/69)

UNITED STATES PATENT OFFICE
CERTIFICATE OF CORRECTION

Patent No. 3,699,895        Dated October 24, 1972

Inventor(s) ALFRED O. PETER

It is certified that error appears in the above-identified patent and that said Letters Patent are hereby corrected as shown below:

Column 13, line 30, after "portion" omit the "o".
Column 18, line 32, after "said" insert --slide--.

Signed and sealed this 9th day of April 1974.

(SEAL)
Attest:

EDWARD M. FLETCHER, JR.
Attesting Officer

C. MARSHALL DANN
Commissioner of Patents